United States Patent Office 3,073,316
Patented Jan. 15, 1963

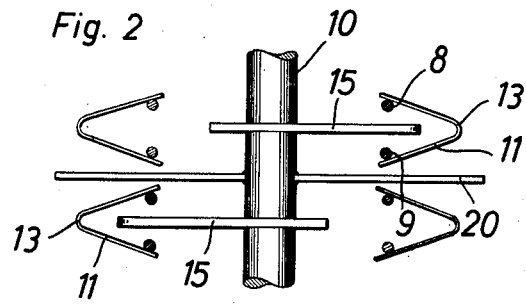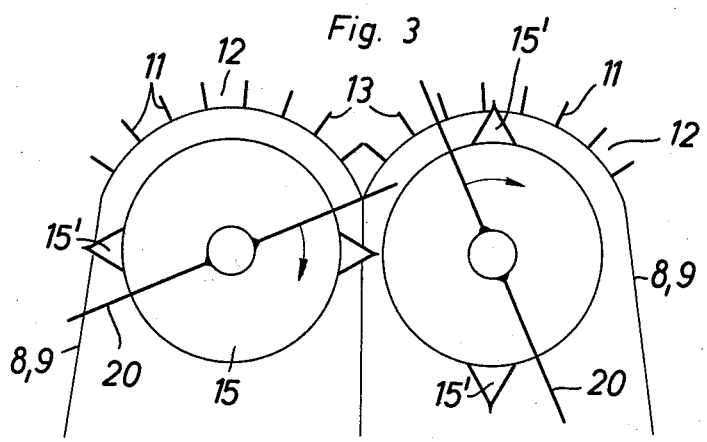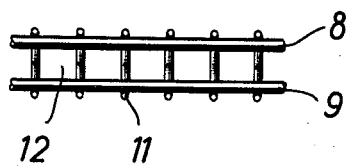

3,073,316
HOP PICKER
Fritz Kibinger and Hans Eder, Munich, Germany; said Eder assignor to said Kibinger
Filed June 27, 1958, Ser. No. 745,177
Claims priority, application Germany June 28, 1957
17 Claims. (Cl. 130—30)

The present invention relates to a new method and apparatus for harvesting hops.

For harvesting the strobiles of hop which is cultivated particularly in the United States and in Central Europe and grows bines to a height of from four to eight meters, the climbing wires around which the hop bines wrap and wind themselves and which are fixed by means of hooks on horizontal wires are usually taken down, whereupon the strobiles are picked off by hand either directly or by cutting the bines at a height of about 1.5 m. above the ground and by then picking the strobiles from the cut bines at a point away from the hop garden. The process of picking the strobiles by hand from the bines which have merely been let down consumes a considerable length of time, whereas the cutting of the bines leads to losses in growth of the hops.

It is an object of the present invention to provide a new method of harvesting hops which overcomes the disadvantages of the previously known methods and also to provide an apparatus for severing the hop strobiles mechanically from the hop bines.

The method according to the present invention essentially consists of merely severing the branches and stems carrying the strobiles from the growing bines, then—if desirable or necessary—to reduce the length of these branches and to collect them, then to feed them to a picking apparatus which separates the branches, leaves, strobiles, and stems from each other, and only then to assort the individual parts in the customary manner. Whether the branches carrying the strobiles are removed by hand from the bines or whether this severing process is carried out mechanically is immaterial insofar as the invention is concerned, even though the mechanical method of severing the branches, for example, by means of rotary cutting tools, results in a considerable saving in time and labor. Generally, it is advisable to cut the branches which have been severed from the bines into pieces of a length of about 20 cm. and to throw them upon a conveyer belt which then carries them to a suitable container, for example, a sack or the like. The cutting mechanism which severs the branches from the bines and the conveying means which pass the branches, which preferably have been cut to about equal length, to the collecting container may be mounted on a movable chassis which may be moved along between the hop rows, for example, by a tractor. When these containers, for example, sacks, are filled, they may be carried or conveyed together or individually to the edge of the hop garden and to a picking apparatus according to the invention which then severs the strobiles from the branches and stems.

The apparatus according to the invention for severing the hop strobiles from the branches essentially consists of a revolving supporting disk which is provided near its peripheral edge and vertically to the plane surfaces thereof with revolving cutters, each of which, in turn, is associated with a grating for supporting the material during the cutting process and with deflectors for preventing the strobiles from passing between the grating. A multitude of cutting or severing operations take place substantially simultaneously by utilizing a large number of revolving cutters and the strobiles are maintained separate or out of reach of the cutters by the deflectors or grating. The material to be severed is thrown into a substantially cylindrical chamber which is surrounded by the gratings and is then thrown by the centrifugal force produced by the revolution of the supporting disk in the direction toward the gratings, whereupon the strobiles are severed by the rotary cutters from the branches, leaves and stems.

Each grating which is associated with one of the rotary cutters preferably consists of two wires, rods or the like, which are partly arcuately bent and one of which is mounted at a point above the plane of the cutting tool, while the other is mounted below such plane. The radius of curvature of each wire, rod or the like is smaller than the maximum radius of the respective tool or tools, and both wires or the like are connected to each other by means of deflecting rods which are preferably substantially V-shaped and extend substantially radially to the axes of the cutting tools. The arcuately bent portions of the deflecting rods should then be disposed at a distance from the axis of rotation of the associated cutting tool which is greater than the size of the radius of the cutting tool. Since the distances between the wires, rods or the like forming the grating also determine the distances between the substantially V-shaped deflecting rods so that even the smallest hop strobiles cannot penetrate through the gaps between these rods or the like, the strobiles will be severed from the stems, leaves and branches without being damaged by the cutting tools since only the stems, leaves and branch parts can pass between the wires, rods or the like forming the grating and only these will be exposed to the action of the cutting tools.

The ends of the partly arcuately curved wires, rods or the like forming the gratings are preferably secured to stays which extend vertically to the plane of the revolving supporting disk and at the peripheral edge thereof. This is advisable particularly when the revolving disk, in which the shafts of the revolving cutting tools are rotatably mounted, is associated with another similar disk. In this event, both disks are preferably rigidly connected to each other by the mentioned stays which carry the partly arcuately curved wires, rods or the like forming the gratings. Both disks may then be mounted so as to be rotatable about a common vertical axis, while between these disks the means for driving the revolving cutting tools will be provided.

For driving the revolving shafts which carry the cutting tools, the central stationary shaft which passes through the supporting disks, and on which these disks are rotatably mounted, is preferably provided with at least one stationary pulley, gear, or the like, while each driven shaft preferably has at least one pulley, gear, or the like secured thereto so as to be rotatable therewith. These pulleys on the different shafts may then be connected with each other by an endless belt, chain, or the like which, when the supporting disks are driven, will revolve the entire unit about its central axis. For driving the belt, chain, or the like, the disk, or one of the two disks, may be provided with a spur or bevel gear which is secured to the shaft of a motor, or one of the disks may be utilized as or be provided with a pulley which is provided by a belt to a driving pulley on the shaft of a motor. Naturally, in place of such a pulley drive, it is also possible to use a chain drive.

Although in principle it would be sufficient to provide each revolving shaft with only one cutting tool with its associated grating, it is advisable to mount several such tools rigidly above each other on each shaft and to provide each cutting tool with a separate grating. Also, it will be of advantage if the superimposed cutting tools will be mounted on their respective shafts so as to permit the distance between them to be adjustable. In any event, the cutting tools on each shaft should be spaced from each other so that the largest strobiles can just pass between two superimposed cutters without being damaged. In order to prevent the areas between the respective superimposed gratings and cutting tools from being clogged, it is advisable to provide between each pair of superimposed cutting tools at least one preferably resilient rod which rotates together with the shaft and the cutting tools thereon and sweeps through the area between the gratings. Each rod should then be mounted and be of such dimensions that it will extend in the direction toward the axis of rotation of the supporting disk or disks and partly beyond the vertical curved area determined by the tips of the deflectors. If each sweeper or pickup rod is connected to the revolving shaft and intersects with its axis of rotation, the radius of this rod should be larger than the distance between the curved parts of the deflector rods and the axis of the shaft. Because of the action of the centrifugal force at the periphery of the supporting disk which rotatably supports the shafts on which the cutting tools are mounted, the severed material will be thrown outwardly in a radial direction and would then ordinarily cover a relatively large area.

In order to facilitate the operation of collecting the severed material and then to convey it to a grading or assorting mechanism, it is advisable to arrange the cutting tools, the gratings, and the supporting disk or disks which carry the driving means within a funnel-like hopper or housing from which the severed material will be conveyed away. The radially ejected material will then be thrown upon the inner wall surfaces of this hopper or housing, along which it will then slide downwardly and pass into an outlet from which it will then pass to a combination of conveyers of a type known as such which will assort the material so as to separate the strobiles from the leaves, stems, and branch parts.

The picking mechanism according to the invention will be easily movable even though its outer diameter might be relatively large, for example, 1.50 m., and it may be easily transported to whichever place it will be needed. Depending upon the most suitable speed at which the material to be severed should be fed into the apparatus and should thereafter be discharged therefrom, the disk or disks may be driven accordingly or suitable provision may be made that the cutting speed of the cutting tools, such as knife blades or the like, will be adapted to result in the most suitable operation of the apparatus.

Further objects, features, and advantages of the present invention will become apparent from the following detailed description, particularly when read with reference to the accompanying drawings, in which:

FIGURE 2 shows a partial side view of a revolving shaft carrying the cutting tools, and of parts of the gratings which are associated with the cutting tools;

FIGURE 3 shows a plan view of two adjacent shafts with the cutting tools thereon together with the associated gratings; while FIGURE 4 shows a partial side view of a grating in an evolute or stretched out position.

Figure 1:
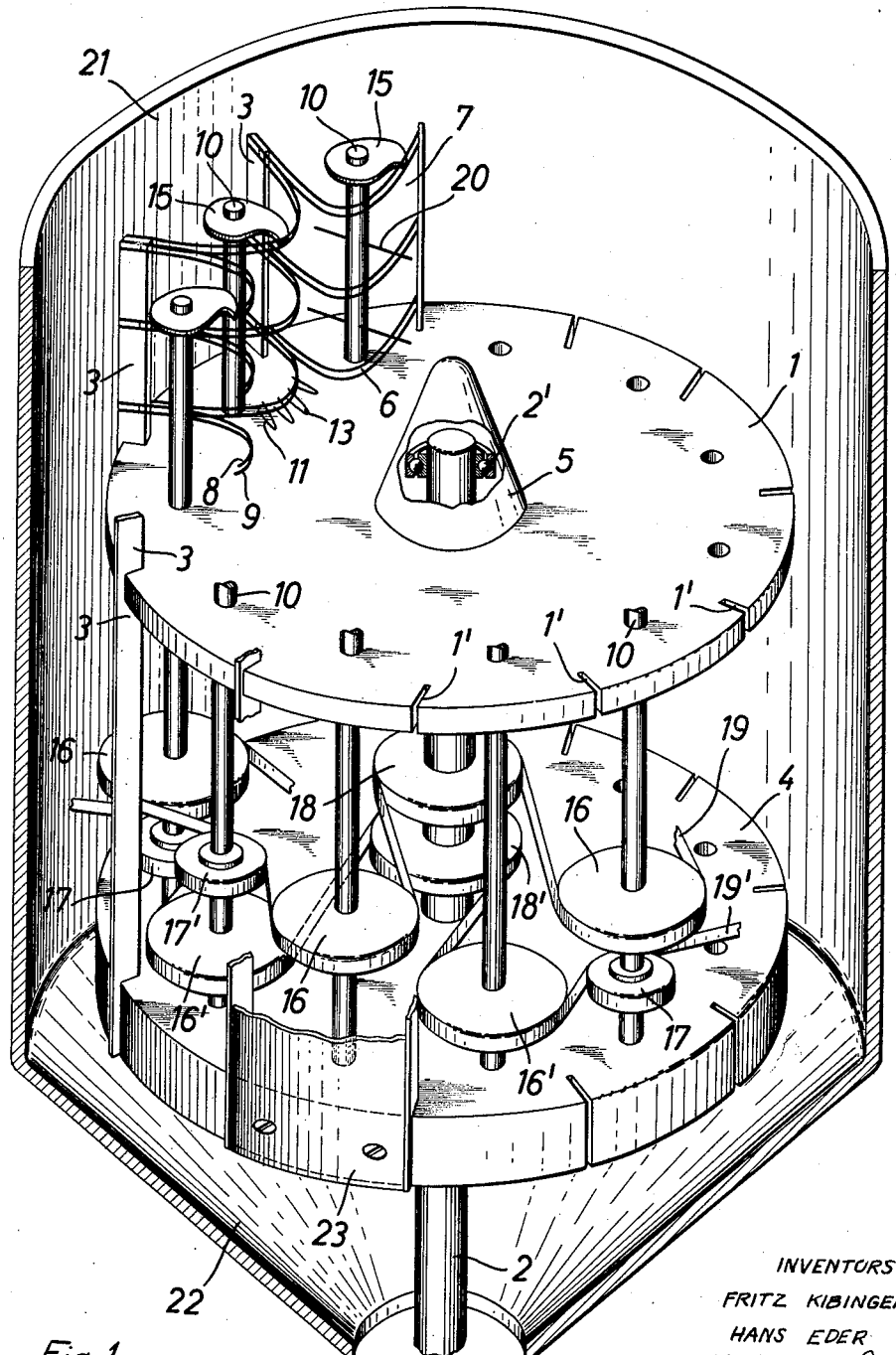
FIGURE 1 shows a perspective view of a hop picking mechanism according to the invention having parts broken away.

Referring to the drawings, and particularly to FIGURE 1, a supporting disk 1 which is provided at its peripheral edge with a plurality of radial notches 1' is mounted on a bearing 2' so as to be freely rotatable about a shaft 2 which is rigidly mounted on any suitable stationary base. Vertical stays 3 rigidly connect supporting disk 1 ot a second supporting disk 4 whcih is likewise freely rotatable on shaft 2. The two supporting disks 1 and 4 are spaced from each other at a greater distance than they would be in actual practice for better illustration of the drive mechanism therefor. The entire unit which is composed of the members 1, 3, and 4, including various other elements thereon, may be rotated either by hand, for example, by means of a crank drive, or by a motor through a suitable transmission which may either consist of a chain or belt drive, or the like. Since the lateral branches of the hop plant which have been precut to a suitable length are dropped from above upon supporting disk 1, the latter is provided with a conical hood 5 which serves as a covering of shaft 2 and also of the bearing 2', and which also deflects the material which is thrown thereon so that, when supporting disk 1 rotates, the centrifugal forces will immediately act upon the material so as to move the same into engagement with the superimposed gratings 6. These gratings are separated by gaps 7 of such a height that even a relatively large hop strobile may pass radially outwardly between them. The gaps 7 as shown in FIGURE 1 are exaggerated for a better illustration of the various elements included in the cutting tools. Each grating 6 consists of two wires, rods, or the like 8 and 9 which are partly arcuately bent and the free ends of which are secured to stays 3. Rods 8 and 9 therefore surround shafts 10 at a certain distance therefrom. Shafts 10 are rotatably mounted in supporting disks 1 and 4 and carry cutting tools 15, each of which is operatively associated with one grating 6. Although for a clearer illustration of the invention FIGURE 1 only shows three shafts 10 fully drawn out and each with only one cutting tool 15, it is to be understood that a considerably larger number of such shafts are actually provided. They are mounted at equal distances from each other and also at equal distances from the peripheral edge of disks 1 and 4. Also, each shaft 10 preferably carries several cutting tools 15 and a similar number of gratings 6. Thus, if each shaft 10 is associated, for example, with three gratings 6, as shown in FIGURE 1, it will also be provided with three cutting tools 15 which are superimposed and spaced at a certain distance from each other. The wires, rods, or the like 8 and 9 of each grating which are disposed substantially vertically above each other are provided with deflecting rods 11 which are preferably V-shaped and extend in a substantially radial direction to the axes of shafts 10 and cutting tools 15, with the two arms of each deflector rod preferably extending within a vertical plane. Only those deflecting rods 11 associated with the rods 8 and 9 surrounding the lowermost blades 15 on the three shafts 10, illustrated in FIGURE 1, are shown in this figure in order to provide a clearer illustration of the cutting tools. The gap 12 intermediate two adjacent deflector rods 11, as shown in FIGURES 3 and 4 is made of a size corresponding to the distance between each pair of superimposed wires or rods 8 and 9 so that even the smallest hop strobiles cannot pass into these gaps. The gratings consisting of the wires or rods 8 and 9 and the deflecting rods 11 are therefore provided in order to protect any hop strobiles from being damaged by the cutting tools, while permitting the strobiles to be severed from the stems, leaves, and branch parts and also permitting these parts to be conveyed away. In order to attain this purpose, the wires, rods or the like 8 and 9 are shaped so that the radius of curvature of the curved portion thereof is smaller than the maximum radius of cutting tools 15, while the bent portions 13 of deflecting rods 11 are spaced from the axis of the respective shaft or the cutting tools thereon at a distance which is greater than the size of the radius of the cutting tools, so that only those parts will be cut by the cutting tools which engage into the areas which are limited by the wires or rods 8 and 9 and the deflecting rods 11 thereof. The deflecting rods 11 may be secured in any suitable manner to the respective rods, wires, or the like 8 and 9, for example, by being welded thereto.

Cutting tools 15 may also be of any suitable shape, for example, of the shape as shown in FIGURE 1 or of the shape as shown in FIGURE 3. In FIGURES 1 and 2, each cutting tool within each respective plane parallel to supporting disk 1 has only one cutting edge, while in FIGURE 3 the cutting tool 15 has two cutting blades 15'. If desired, the cutting tool may also have more than two cutting edges, and instead of knife blades it may also be provided with saw blades. The wires, rods, or the like 8 and 9 of the grating which is associated with such a cutting tool will then act as a support for the material to permit it to be severed during the cutting process.

In the embodiment of the invention as illustrated in FIGURE 1, each alternate shaft 10 also carries intermediate the main supporting disks 1 and 4 either an upper disk 16 or a lower disk 16' within two different horizontal planes. All except two of shafts 10 also carry guide rollers 17 or 17', respectively, and each of these guide rollers is disposed on its shaft within the same plane as disks 16 or 16' on the adjacent shafts 10. However, whereas disks 16 and 16' are rigidly secured to shafts 10 so as to rotate therewith, guide rollers 17 and 17' are freely rotatable thereon. The stationary central shaft 2 also carries a pair of stationary disks 18 and 18' within the same two planes in which disks 16 and 16' are located. Disks 16, 16' and 18, 18', and guide rollers 17, 17' may be either in the form of pulleys or gear wheels, and depending upon whichever is used, either a pair of endless belts 19 or 19', or a pair of endless chains may be wound around the disks and guide rollers within the two planes in the manner as clearly illustrated in FIGURE 1. If the unit composed of supporting disks 1 and 4, stays 3, and shafts 10 with disks 16, 16' and guide rollers 17, 17' thereon is rotated on bearings 2' either by hand or by a motor, all shafts 10 will rotate about their axes in the same direction.

In order to prevent the material from damming up during the cutting operation and to assist it in passing to the cutting area after being fed upon the upper supporting disk 1, it is advisable to provide each shaft 10 with one or more pickup rods 20 at a point intermediate two adjacent cutting tools 15. These rods 20 which will thus revolve with shafts 10 and the cutting tools 15 thereon are preferably made of a length so that the circle described by the outer ends thereof will have a radius of a size which is at least equal to the size of the distance between the curved points 13 of deflector rods 11 and the axis of rotation of the respective shaft 10 on which they are mounted. These pickup rods 20 will pick up and take along the severed material and assist in throwing it outwardly of the apparatus. Thus, the material which has been filled into the apparatus will always be fed to the cutting tools 15 and 15' through the gaps between the adjacent deflectors 11 on each grating 6. FIGURE 3 illustrates that those deflector rods 11 on the gratings 6 for one shaft 10 which are nearest to the deflector rods 11 on the gratings 6 for the adjacent shaft 10 will deflect and convey the material, which lies in front of the gaps 12 between the adjacent deflectors, toward the grating which surrounds the adjacent shaft 10 so that it will then be cut by the cutting tools 15 on this latter shaft. The severed parts of the material will be conveyed outwardly by the action of the centrifugal force and be thrown upon the inner wall of a stationary hopper 21 which surrounds the entire revolving apparatus. From this wall the material will then fall downwardly and through an opening 22 at the lower end of the hopper from which it will be passed to a suitable grading or assorting mechanism. In order to prevent the severed material, after being thrown upon the inner wall of hopper 21, from falling into the cylindrical area between the supporting disks 1 and 4, and from jamming the machinery therein, this area is preferably enclosed by an outer cover which may, for example, consist of a plurality of plates 23 which are curved in accordance with the curvature of the peripheral surface of disks 1 and 4 and are of a thickness in accordance with the extent which the stays 3 project outwardly of the peripheral surface of disks 1 and 4, so that the outer surfaces of these cover plates 23 will be flush with the outer surfaces of stays 3 and will together with these form a smooth cylindrical surface. These plates 23, a part of one of which is shown in FIGURE 1, and which, if desired, may be of a transparent material, may be removably secured either to stays 3 or to disks 1 and 4 to permit an easy access to the machinery in the event that it may require any servicing.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. An apparatus for severing hop strobiles from the branches carrying the same, comprising at least one rotatable supporting disk adapted to receive the material to be severed and to convey the same outwardly by centrifugal force, a plurality of shafts, each rotatably supported by said disk near the peripheral edge thereof and adapted to revolve with said disk about the central axis thereof and projecting vertically upward from the upper surface of said disk, at least one cutting tool secured to each of said rotatable shafts, a grating substantially surrounding each of said cutting tools and adapted to form a support of the material while being cut by said tools, and deflecting means on said gratings for preventing the strobiles from entering said gratings, the area on said supporting disk intermediate said gratings being adapted to receive the material to be cut.

2. An apparatus as defined in claim 1, wherein each of said gratings substantially surrounding a rotatable cutting tool comprises a pair of substantially arcuately curved rods disposed vertically above each other and closely above the plane of the upper surface and closely below the plane of the lower surface of the associated cutting tool, respectively, the radius of curvature of said rods facing toward the central vertical axis of said supporting disk being smaller than the maximum radius of said cutting tool so as to permit said cutting tool to penetrate slightly through the gap between said rods, said deflecting means comprising a plurality of substantially V-shaped rods secured to each pair of said grating rods and connecting the same to each other, and extending substantially radially to the axis of said supporting disk, the curved outer ends of said deflecting rods being spaced from the axis of rotation of the associated cutting tool at a distance greater than the size of the radius of said cutting tool, said two rods of each grating being spaced from each other to form a gap of a size not permitting even the smallest strobiles to enter therein.

3. An apparatus as defined in claim 2, further comprising a plurality of stays mounted on said supporting disk and projecting vertically upward therefrom near the peripheral edge thereof, the free ends of said grating rods being secured to said stays.

4. An apparatus as defined in claim 1, further comprising a second supporting disk coaxial to said first supporting disk but spaced therefrom, means for securing said supporting disks to each other, both of said disks being rotatable about a common vertical axis, and driving means for rotating said shafts carrying said cutting tools disposed within the area intermediate said supporting disks.

5. An apparatus as defined in claim 4, further comprising a stationary central shaft, bearing means on said shaft for rotatably supporting said supporting disks, said rotatable shafts carrying said cutting tools above the upper surface of said first supporting disk being rotatably mounted in both of said supporting disks, said driving means comprising at least one stationary wheel mounted on said stationary shaft, and at least one wheel secured to and rotatable with each of said rotatable shafts, and endless driving means connecting said rotatable wheels with said stationary wheel so that, when the entire unit including said supporting disk, said securing means, and said rotatable shafts with said rotatable wheels thereon is rotated about the axis of said stationary shaft, said rotatable wheels will roll along said endless driving means and will thereby rotate each of said rotatable shafts and said cutting means thereon.

6. An apparatus as defined in claim 1, wherein each of said rotatable shafts carries a plurality of cutting tools superimposed upon and in a spaced relation to each other, each of said cutting tools having a separate grating associated therewith.

7. An apparatus as defined in claim 6, wherein the distance between said cutting tools on each of said rotatable shafts is adjustable.

8. An apparatus as defined in claim 6, wherein the adjacent superimposed cutting tools on each of said rotatable shafts are spaced from each other to form a gap of a size permitting the largest hop strobiles just to pass therethrough by the action of said centrifugal force without being damaged.

9. An apparatus as defined in claim 6, wherein each of said superimposed cutting tools is associated with a separate grating, said adjacent superimposed gratings being spaced from each other to form a gap of a size permitting the largest hop strobiles just to pass therethrough by the action of said centrifugal force without being damaged.

10. An apparatus as defined in claim 6 further comprising at least one resilient pickup rod secured to each of said rotatable shafts intermediate the adjacent cutting tools on said shaft and adapted to revolve with said shaft and said cutting tools to sweep through the gap between said adjacent cutting tools.

11. An apparatus as defined in claim 2, wherein each of said rotatable shafts carries a plurality of cutting tools superimposed upon and in a spaced relation to each other, each of said cutting tools having a separate grating associated therewith, and further comprising at least one resilient pickup rod secured to each of said rotatable shafts intermediate the adjacent cutting tools on said shaft and adapted to revolve with said shaft and said cutting tools through the gap between said adjacent cutting tools, each of said pickup rods extending beyond the curved vertical plane defined by the ends of said deflector rods in the direction toward the axis of rotation of said supporting disk.

12. An apparatus as defined in claim 1, further comprising a stationary substantially cylindrical housing surrounding said rotatable supporting disk and the various means thereon, and having an opening at least at its upper end, the inner wall of said housing being adapted to receive the cut material being thrown thereon by said centrifugal force.

13. An apparatus as defined in claim 12, wherein said substantially cylindrical housing has a funnel-like restricted lower end portion, said cut material collected on said inner wall of said housing being adapted to drop by gravity along said wall and upon said funnel-like lower end portion and to slide by gravity along said portion toward the lower end opening thereof.

14. An apparatus as defined in claim 4, further comprising a stationary, substantially cylindrical housing surrounding said rotatable supporting disks and the various means thereon and having an opening at least at its upper end, the inner wall of said housing being adapted to receive the cut material being thrown thereon by said centrifugal force, and means connecting said supporting disks to each other along the outer periphery thereof and completely enclosing the area intermediate said supporting disks for preventing the cut material falling downwardly from said wall of said housing from entering into said area.

15. An apparatus for severing hop strobiles from cut branches carrying the same, comprising grating means for engaging and supporting the branches, and a plurality of cutting means movable relative to said branch-engaging means for substantially simultaneously performing a multitude of cutting operations on said branches to sever the strobiles therefrom, said branch-engaging means being supported adjacent said cutting means and being so constructed and arranged as to define apertures through which branch portions of said hops are movable to be severed by said cutting means but to maintain said strobiles separate from said cutting means during said cutting operations to prevent damage to the strobiles, said cutting means being constituted by a plurality of flat rotating blades having a predetermined path of movement, said branch-engaging means including wires bent around the path of movement of said blades and wires on opposite sides of the path of movement of each respective blade to which the ends of said first-mentioned wires are secured for supporting the latter.

16. An apparatus for severing hop strobiles from branches carrying the same comprising at least one cutting means including a rotatable shaft and at least one cutting tool mounted thereon, grating means substantially surrounding each cutting means, said grating means being so constructed and arranged as to form a support for said cut branches while the strobiles are being severed by said cutting means and including gratings substantially surrounding each cutting tool comprising a pair of substantially arcuately curved rods disposed vertically above each other and closely above the plane of the upper surface and closely below the plane of the lower surface of the associated cutting tool, respectively, the radius of curvature of said rods being smaller than the maximum radius of said cutting tool so as to permit said cutting tool to penetrate slightly through the gap formed between said rods, and deflecting means on said grating for preventing the severed strobiles from entering said grating, said deflecting means comprising a plurality of substantially V-shaped rods secured to said grating rods and connecting said pair thereof together, said V-shaped rods extending approximately radially to the axis of said rotatable shaft, the curved outer ends of said deflecting rods being spaced from the axis of rotation of the associated cutting tool a distance greater than the maximum radius of said cutting tool, said two rods of each grating being spaced from each other to form a gap of a size not permitting the smallest strobiles to enter therein.

17. An apparatus for severing hop strobiles from cut branches carrying the same, comprising grating means for engaging and supporting the branches, and a plurality of cutting means movable relative to said branch-engaging means for substantially simultaneously performing a multitude of cutting operations on said branches to sever the strobiles therefrom, said branch-engaging means being supported adjacent said cutting means and being so constructed and arranged as to define apertures through which branch portions of said hops are movable to be severed by said cutting means but to maintain said strobiles separate from said cutting means during said cutting operations to prevent cutting damage to the strobiles, said cutting means being constituted by a plurality of flat rotating blades having a predetermined path of movement, said branch-engaging means including rod-like elements bent around the path of movement of said blades and second rod-like elements arranged on opposite sides of the path of movement of each respective blade, the ends of said first-mentioned rod-like elements being secured to said second rod-like elements for supporting thereof.

References Cited in the file of this patent

UNITED STATES PATENTS

| | | |
|---|---|---|
| 2,370,331 | Susunaga | Feb. 27, 1945 |
| 2,487,911 | Wehn | Nov. 15, 1949 |
| 2,502,032 | Watson | Mar. 28, 1950 |
| 2,685,773 | Dauenhauer | Aug. 10, 1954 |
| 2,699,172 | Regimbal et al. | Jan. 11, 1955 |
| 2,750,945 | Crowley | June 19, 1956 |
| 2,763,114 | Carruthers | Sept. 18, 1956 |
| 2,883,746 | Gilsi | Apr. 28, 1959 |

FOREIGN PATENTS

| | | |
|---|---|---|
| 334,888 | France | Nov. 6, 1903 |
| 162,495 | Austria | Mar. 10, 1949 |